US006629349B2

(12) United States Patent
King

(10) Patent No.: US 6,629,349 B2
(45) Date of Patent: Oct. 7, 2003

(54) APPARATUS FOR REMOVAL AND INSTALLATION OF A FUEL INJECTOR

(75) Inventor: Kenneth E. King, Columbus, IN (US)

(73) Assignee: Cummins Engine Company, Inc., Columbus, IN (US)

( * ) Notice: Subject to any disclaimer, the term of this patent is extended or adjusted under 35 U.S.C. 154(b) by 0 days.

(21) Appl. No.: 09/920,393

(22) Filed: Aug. 1, 2001

(65) Prior Publication Data

US 2003/0033714 A1 Feb. 20, 2003

(51) Int. Cl.[7] ..... B23P 19/04

(52) U.S. Cl. ..... 29/267

(58) Field of Search ..... 29/219, 220, 221, 29/214, 213.1, 267

(56) References Cited

U.S. PATENT DOCUMENTS

| | | | | | |
|---|---|---|---|---|---|
| 1,500,536 | A | * | 7/1924 | Taylor | 29/220 |
| 1,893,962 | A | * | 1/1933 | Rowan | 29/220 |
| 1,932,728 | A | * | 10/1933 | Glantz | 29/220 |
| 4,293,992 | A | * | 10/1981 | Webb | 29/267 |
| 4,567,634 | A | * | 2/1986 | Landry | 29/220 |
| 4,780,942 | A | * | 11/1988 | Bernat | 29/219 |
| 5,014,409 | A | * | 5/1991 | Hippach | 29/267 |

* cited by examiner

*Primary Examiner*—Robert C. Watson
(74) *Attorney, Agent, or Firm*—Woodard, Emhardt, Moriarty, McNett & Henry LLP

(57) ABSTRACT

A method and apparatus for the manipulation of a fuel injector in association with an internal combustion engine. In one form a fuel injector tool is pivotally coupled to a cylinder head and rotated to apply a removal or installation force to a fuel injector. The tool is adapted to be installed within the tight confines of a cylinder head.

17 Claims, 4 Drawing Sheets

APPARATUS FOR REMOVAL AND INSTALLATION OF A FUEL INJECTOR

BACKGROUND OF THE INVENTION

The present invention relates in general to a method and apparatus for the installation and removal of a fuel injector from an internal combustion engine. More particularly, in one form the present invention relates to a tool adapted to engage the fuel injector and transmit sufficient force to remove the fuel injector from the engine and/or install the fuel injector to the engine.

Many internal combustion engines, whether compression ignition or spark ignition are provided with fuel injection systems to satisfy the need for precise and reliable fuel delivery into the combustion chambers of the engine. Such precision and reliability is necessary to address the goals of increasing fuel efficiency, maximizing power output and controlling the undesirable by-products of combustion.

A fuel injector is a precision device that must meter the quantity of fuel required for each cycle of the engine and must develop the high pressure necessary to inject the fuel into the combustion chamber at the correct instant of the operating cycle. A fuel injector is a mechanical component that operates in a relatively hostile operating environment and has associated therewith a demand for periodic maintenance including cleaning, repair or replacement. Fuel injector maintenance generally requires removal of the fuel injector from the internal combustion engine. Removal of a fuel injector can be a challenging proposition because of the crowded nature of the cylinder head or the intake manifold in which the injectors are located and the mechanical loads that are applied to the fuel injector during installation and operation. This is especially true of engines where the fuel injector delivers fuel directly into the combustion chamber.

In order to try and solve, or at least minimize the inconvenience to technicians while removing and/or installing fuel injectors, engineers have developed many different tools to assist in fuel injector removal. The following listing of references is believed to be representative of such earlier designs.

REFERENCES

| U.S. Pat. No. | Patentee | Issue Date |
|---|---|---|
| 3,670,389 | Shepanski | Jun. 20, 1972 |
| 4,293,992 | Webb | Oct. 13, 1981 |
| 4,561,159 | Schuster | Dec. 31, 1965 |
| 4,780,942 | Bernat | Nov. 1, 1988 |
| 5,014,409 | Hippach | May 14, 1991 |
| 5,075,947 | Jessup, et al. | Dec. 31, 1991 |

Even with the variety of earlier designs there remains a need for an improved method and apparatus for the installation and/or removal of fuel injectors from an internal combustion engine. The present invention satisfies this need in a novel and unobvious way.

SUMMARY OF THE INVENTION

One form of the present invention contemplates a tool for manipulating a fuel injector relative to an internal combustion engine, comprising: a main body member including a force receiving portion adapted to receive a force and a fuel injector engagement portion adapted to engage the fuel injector; a pivot member rotatably coupled with the main body member; and a fastener engaging the pivot member and adapted to fixedly couple the pivot member to the internal combustion engine, the main body member is rotatable about the pivot member in response to a force applied to the force receiving portion of the main body member, and the fuel injector engagement portion is adapted to transmit the force to the fuel injector.

Another form of the present invention contemplates a method of utilizing a tool to remove a fuel injector from an internal combustion engine. The method, comprising: positioning a fuel injector engagement portion of the tool adjacent a portion of the fuel injector; attaching a first portion of the tool to the internal combustion engine at a position spaced away from the fuel injector; and, rotating a second portion of the tool about the first portion of the tool to move the fuel injector engagement portion of the tool away from the internal combustion engine and transmit a force to move the fuel injector away from the internal combustion engine while the first portion of the tool is fixedly attached to the internal combustion engine.

Yet another form of the present invention contemplates a method of utilizing a tool to install a fuel injector in an internal combustion engine. The method, comprising: locating the fuel injector adjacent a fuel injector mounting location of the internal combustion engine; positioning a fuel injector engagement portion of the tool adjacent a portion of the fuel injector; attaching a first portion of the tool to the internal combustion engine at a position spaced away from the fuel injector; and, rotating a second portion of the tool about the first portion of the tool to move the fuel injector engagement portion of the tool toward the internal combustion engine and apply a force to move the fuel injector into a bore within the internal combustion engine while the first portion of the tool is fixedly attached to the engine.

One object of the present invention is to provide a unique apparatus for installing and/or removing a fuel injector from an internal combustion engine.

Related objects and advantages of the present invention will be apparent from the following description.

Figure 1:
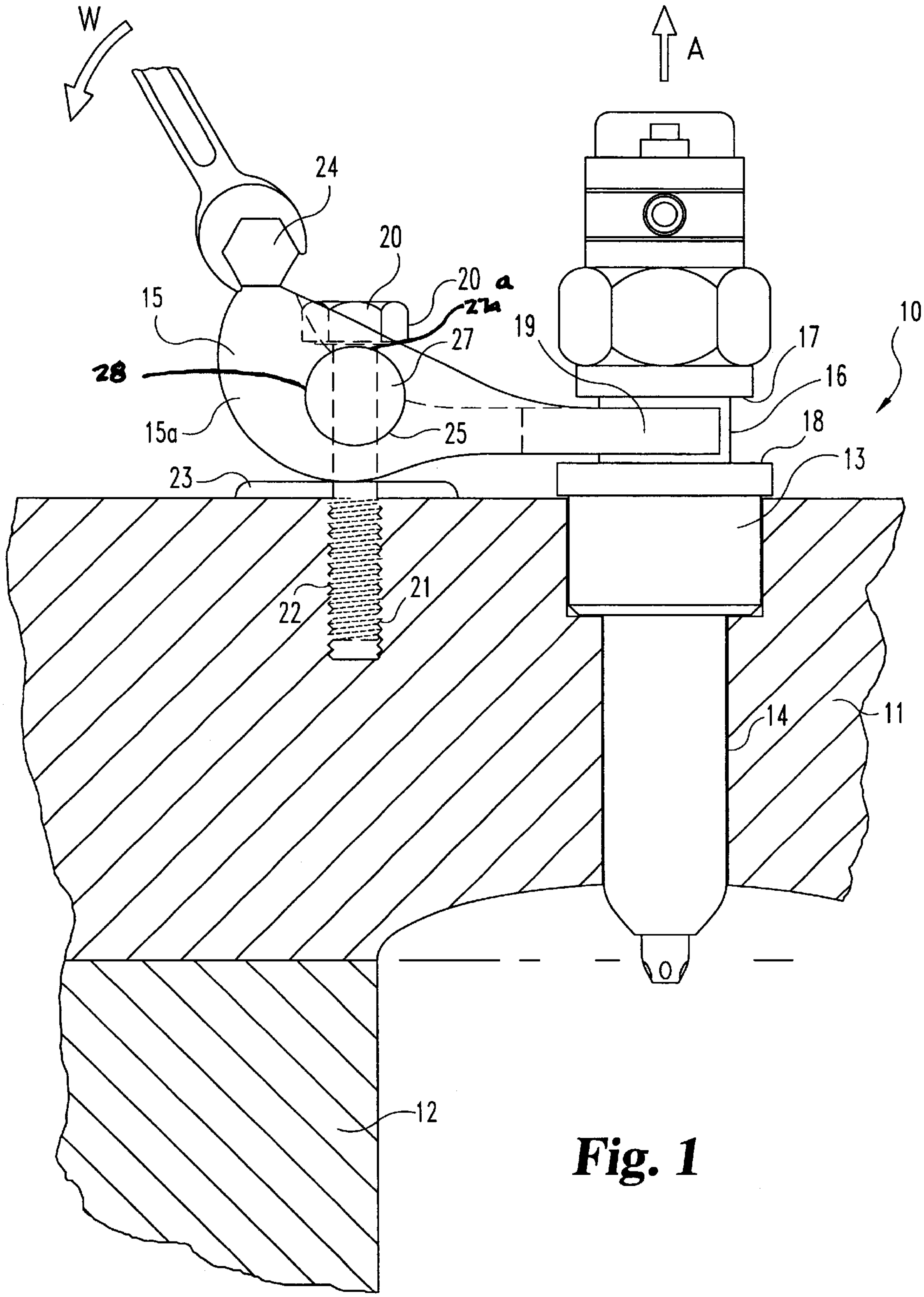
FIG. 1 is an illustrative side elevational view of one embodiment of the tool of the present invention positioned between a fuel injector and the cylinder head of an internal combustion engine.

FIGS. *4a–4c* are a schematic representation of the manipulation of the fuel injector tool to facilitate the removal of the fuel injector from the internal combustion engine.

FIGS. *5a* and *5b* are a schematic representation of the manipulation of the fuel injector tool to facilitate the installation of the fuel injector within a bore comprising a portion of the internal combustion engine.

DESCRIPTION OF THE PREFERRED EMBODIMENTS

For the purposes of promoting an understanding of the principles of the inventions, reference will now be made to the embodiments illustrated in the drawings and specific language will be used to describe the same. It will nevertheless be understood that no limitation of the scope of the inventions is thereby intended, such alterations and further modifications in the illustrated device, and such further applications of the principles of the inventions as illustrated therein being contemplated as would normally occur to one skilled in the art to which the invention relates.

With reference to FIG. 1, there is illustrated a side elevational view of an internal combustion engine 10 including a cylinder head 11 coupled to an engine block 12. A fuel injector 13 is received within a bore 14 formed within the internal combustion engine. More specifically, in one form of the present invention the fuel injector 13 is received within a bore 14 formed in the cylinder head 11. The present invention will be described with reference to the fuel injector being located in the cylinder head, however, it is also contemplated that the fuel injector can be mounted in other components such as the intake manifold. A person of ordinary skill in the art will appreciate that a fuel injected internal combustion engine generally has a plurality of fuel injectors. Operation of a fuel injector and internal combustion engine will not be described in any further detail as they are believed well known to one of ordinary skill in the art.

The present invention is generally directed to a fuel injector tool 15 that can be utilized to manipulate a fuel injector relative to an internal combustion engine. The term manipulate is intended to have a broad meaning and will include, but not limited to, installing and/or removing the fuel injector from the engine. In one form of the present invention the fuel injector tool 15 is pivotally coupled to the cylinder head 11 of the internal combustion engine 10 and engages a tool-receiving portion 16 of the fuel injector 13. The tool-receiving portion 16 of the fuel injector 13 is adapted to receive a fuel injector engagement portion 19 of the fuel injector tool 15 and transmit a force to the fuel injector 13. In a preferred form the tool-receiving portion 16 is of a reduced size and includes force receiving surfaces 17 and 18 that are adapted to receive a force transmitted from the fuel injector engagement portion 19. Fuel injector tool 15 is removably coupled to the cylinder head 11 at a fastener attachment location and is preferably pivotally mounted to the cylinder head 11 by a fastener 20. In one preferred form of the present invention the threaded fastener 20 is defined by a bolt having a head **20*a* and an externally threaded portion 21 that engages a threaded opening 22 in the cylinder head 11**.

One form of the present invention includes the threaded fastener 20 engaging the threaded opening 22 at a boss location 23, however other forms of the present invention contemplate that the threaded opening in the cylinder head is not associated with a boss location. In one embodiment of the present invention, the fastener attachment location is defined by a threaded opening that had been utilized to receive a fastener to mount an intake or exhaust rocker arm to the engine. It should be understood to one of ordinary skill in the art that the intake or exhaust rocker arm was removed to enable the fuel injector tool 15 to be pivotally mounted to the internal combustion engine by the fastener 20 engaging the threaded opening 22. However, it is understood that the fuel injector tool 15 can be removeably pivotally coupled to the internal combustion engine at a multitude of locations besides those associated with rocker arm mounting locations. Further, in one alternate embodiment of the present invention it is contemplated to drill and tap a threaded opening in the cylinder head to facilitate the mounting of the fuel injector tool 15.

A brief description of the installation and method of using the fuel injector tool 15 will now be provided prior to providing further details associated with the tool 15. In one form of the present invention, the fuel injector tool 15 has the fuel injector engagement portion 19 located adjacent the tool receiving portion 16 of the fuel injector 13. Fastener 20 is passed through the fuel injector tool 15 and engages the internally threaded opening 22 in the cylinder head 11. The fuel injector tool 15 is pivotally coupled to the cylinder head 11 and the fuel injector engagement portion 19 is moveable to abut and press against at least one of the force receiving surfaces 17 and 18. A technician then applies a force, in the direction of arrow W, to the force receiving portion 24 of fuel injector tool 15 to cause the tool to pivotally move and push against the fuel injector 13 to remove it from the bore 14 defined in the cylinder head 11. Force receiving portion 24 can have many alternate configurations provided it allows the transmission of a force to the fuel injector tool 15. The direction of removal for the fuel injector 13 is shown generally in FIG. 1, by arrow A. Application of a force in the direction opposite to arrow W can be utilized to install the fuel injector 13 in the bore 14 of the internal combustion engine. The present invention is not limited to a multi-function tool and in another form of the present invention there is contemplated a fuel injector tool 15 that has application to only one mode of operation, be it installation or removal.

Figure 2:
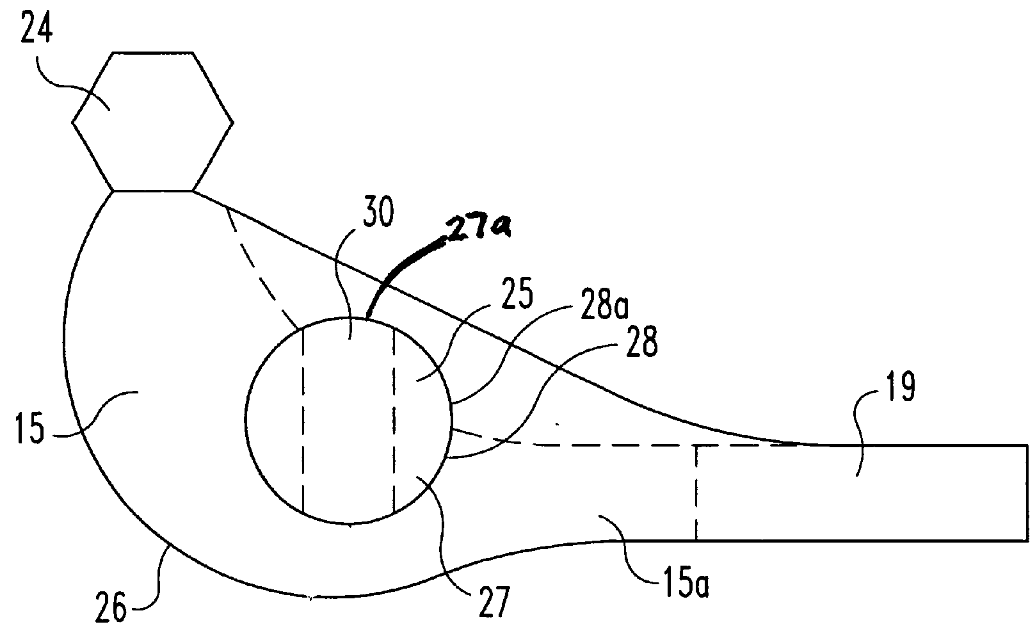
FIG. 2 is a side elevational view of the tool of FIG. 1.
Figure 3:
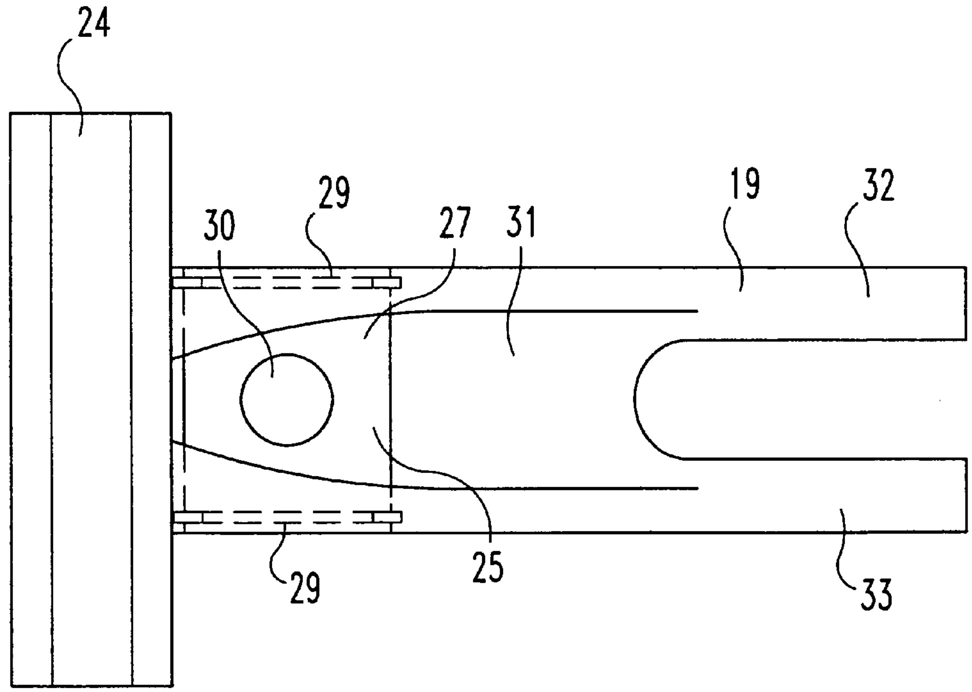
FIG. 3 is a top plan view of the tool of FIG. 1.

With reference to FIG. 2 and FIG. 3, there is illustrated one embodiment of the fuel injector tool 15 apart from the internal combustion engine. In one form of the present invention the fuel injector tool 15 includes a unitary main body member **15*a* with the fuel-injector-engagement portion 19, the force-receiving portion 24 and the pivot-mounting portion 25. However, in an alternate embodiment there is contemplated a mutli-part main body member. The pivot-mounting portion 25 is generally disposed between the fuel injector-engagement portion 19 and the force-receiving portion 24 of the main body member 15*a***. The fuel injector tool is preferably formed of a metallic material, however, the tool is not limited to being formed of a metallic material and other materials such as, but not limited to high strength composite materials, plastics and polymers are contemplated herein.

The fuel injector tool 15 has a substantially curved base portion 26 that is adapted to rotate relative to the surface of the cylinder head 11 in response to a force being applied through the force-receiving portion 24. A pivot member 27 is rotatably mounted within an aperture 28 formed through the unitary main body member **15*a*. In a preferred form of the present invention the pivot member 27 is located substantially within the main body member 15*a*. In one form of the present invention a pair of keepers 29 are utilized to retain the pivot member 27 within the main body 15*a*. In one embodiment the pair of keepers 29 is defined by snap-rings, however, other types of keepers including machined and press-fit components are contemplated herein. The pivot member 27 includes an aperture 30 formed therethrough that is sized to allow the passage of fastener 20 therethrough. In one embodiment of the present invention the installed fastener 20 and the pivot member 27 are oriented substantially perpendicular to one another. Fastener head 20*a* (FIG. 1) bears against an outer surface 27*a* of the pivot member 27 and fixedly attaches the pivot member 27 to the cylinder head 11. A cylindrical shaped member defines the pivot member 27 in one form, however other geometric shapes for pivot member 27 are contemplated herein. Main body member 15*a* is rotatable about the pivot member 27 as it is fixed to the internal combustion engine in response to force applied to the tool. The main body member 15*a* through one of it's wall members 28*a* bears against and is rotatable on the outer surface 27***a* of the pivot member 27. In another form of the present invention there are included bushings within the opening to provide a bearing surface between the main body member 15*a* and the pivot member 27. In one form of the present invention there is a relief area 31 formed in the main body member 15*a*.

Fuel injector engagement portion 19 is defined by at least one engagement prong. More preferably, a pair of spaced forks 32 and 33 defines the fuel injector engagement portion 19. The forks 32 and 33 are spaced apart to accept the tool-receiving portion 16 of the fuel injector. In one form of the present invention the pair of spaced forks 32 and 33 function to collar the fuel injector. In another form of the present invention the distance between the forks 32 and 33 is adjustable to enable the application of the fuel injector tool 15 to a variety of fuel injectors having varying size fuel injector engagement portions.

Figure 4C:
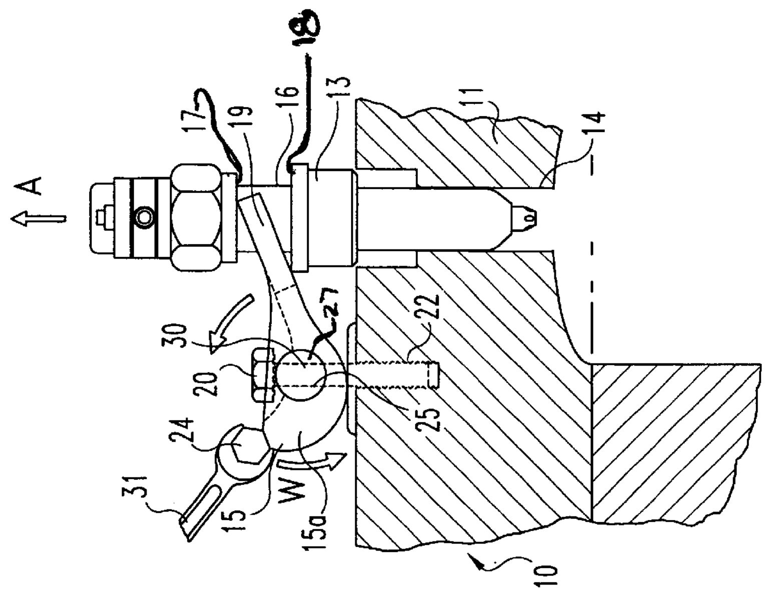
Figure 4B:
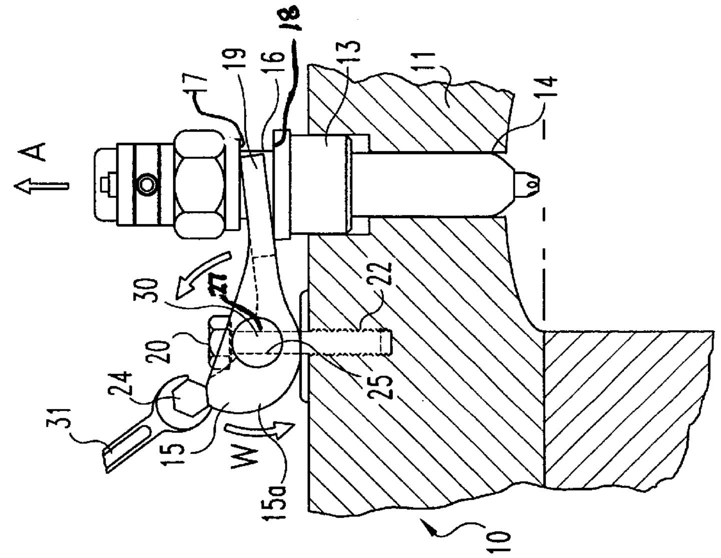
Figure 4A:
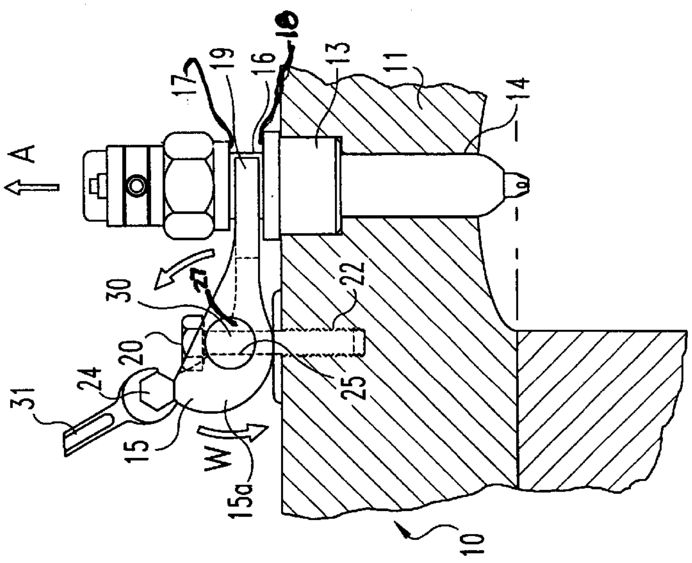

With reference to FIGS. 4*a*–4*c,* there will be described the removal of the fuel injector 13 from the bore 14 formed in the cylinder head 11. The removal process being described is preferably a non-destructive process that will enable the fuel injector 13 to be repaired rebuilt and/or cleaned. In one form of the present invention a component attached to the internal combustion engine 10 is removed to provide an internally threaded opening 22 that can be utilized in pivotally mounting the fuel injector tool 15. However, other internally threaded openings located in an appropriate location are contemplated herein for mounting the fuel injector tool 15. The fuel injector engagement portion 19 of the fuel injector tool 15 is positioned adjacent the tool-receiving portion 16, and preferably proximate the surfaces 17 and 18. The pivot-mounting portion 25 of the fuel injector tool 15 is aligned with the internally threaded opening 22 at a position spaced from the fuel injector 13. The pivot-mounting portion 25 is fixedly attached to the internal combustion engine 10. In a preferred form fastener 20 is passed through the aperture 30 defined in the pivot member 27 and threaded into the internally threaded opening 22. Main body member 15*a* of fuel injector tool 15 is rotated in the direction of arrow W about the pivot member 27, thereby causing the fuel injector engagement portion 19 to move away from the internal combustion engine and transmit a force through surface 17 to the fuel injector. The continued rotation of the main body member 15*a* will cause the fuel injector 13 to be moved away from the internal combustion engine and out of the bore 14.

The rotation of the main body member 15*a* relative to the fixed pivot member 27 is preferably caused by a technician applying a torque to the force-receiving portion 24 through wrench 31. However, other methods to apply a torque to the force-receiving portion 24 are contemplated herein.

Figure 5B:
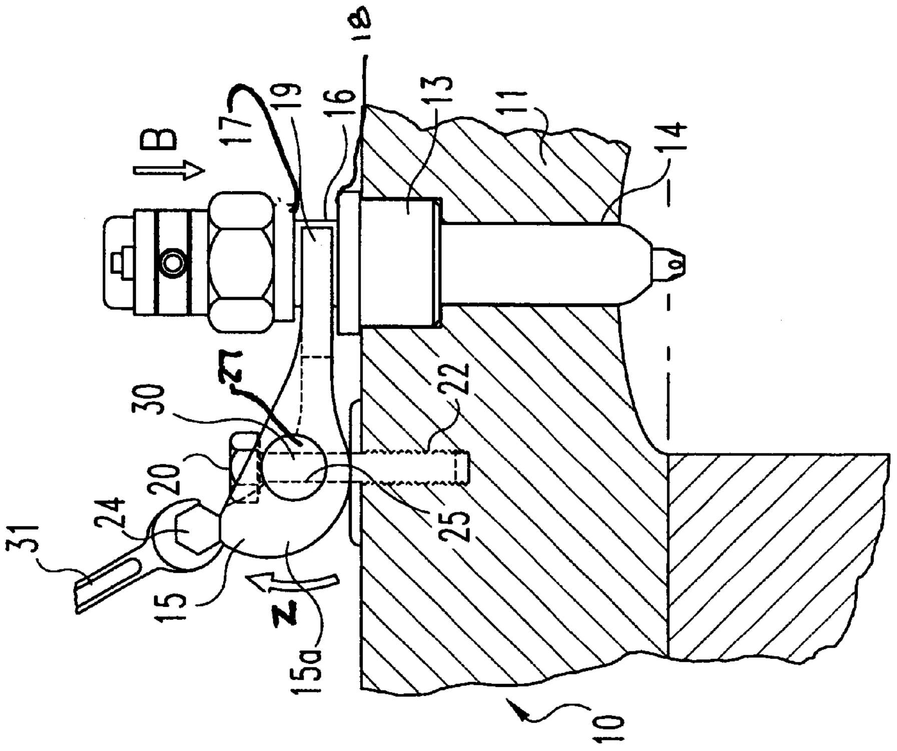
Figure 5A:
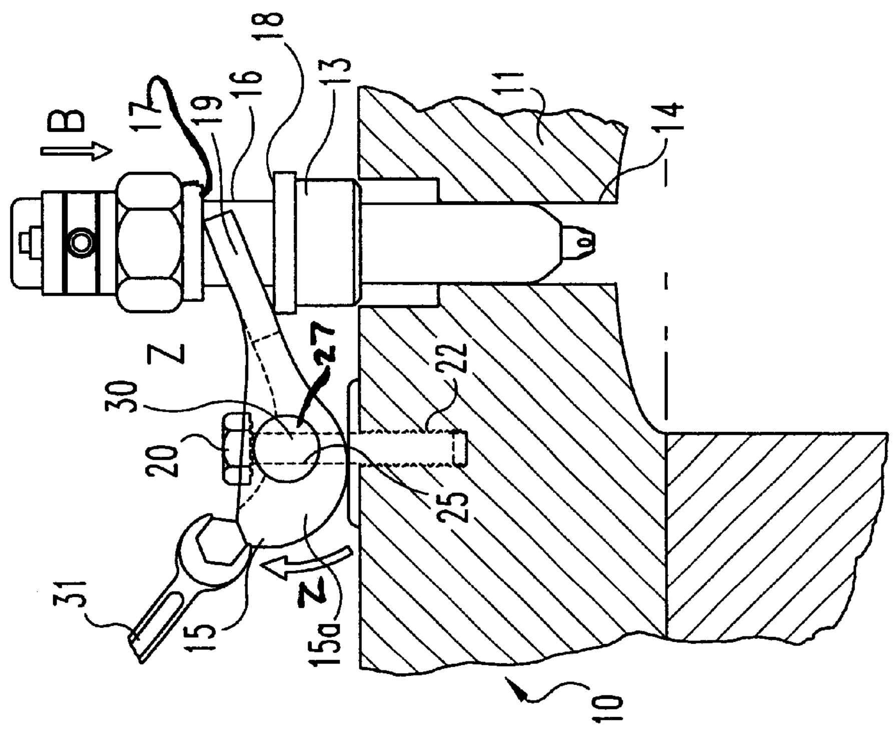

With reference to FIGS. 5*a* and 5*b,* there will be described the installation of a fuel injector 13 within a bore 14 formed in the internal combustion engine 10. In one form of the present invention a component attached to the internal combustion engine 10 is removed to provide an internally threaded opening 22 that is utilized in mounting the fuel injector tool 15. However, other internally threaded openings located in an appropriate location are contemplated herein for mounting the fuel injector tool 15 to the engine. The fuel injector engagement portion 19 of the fuel injector tool 15 is positioned adjacent the tool-receiving portion 16. The pivot-mounting portion 25 of the fuel injector tool 15 is aligned with the internally threaded opening 22 at a position spaced from the fuel injector 13. The pivot-mounting portion 25 is fixedly attached to the internal combustion engine. In a preferred form the fastener 20 is passed through the aperture 30 in the pivot member 27 and threaded into the internally threaded opening 22. Main body member 15*a* of fuel injector tool 15 is rotated in the direction of arrow Z about the pivot member 27, thereby causing the fuel injector engagement portion 19 to move toward the internal combustion engine and abut surface 18 and transmit a force to the fuel injector. The continued rotation of the main body member 15*a* will cause the fuel injector 13 to be moved further into the bore 14 of the internal combustion engine. In one form of the present invention the fuel injector tool 15 is utilized to finally seat the fuel injector to the internal combustion engine 10.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. It should be understood that while the use of the word preferable, preferably or preferred in the description above indicates that the feature so described may be more desirable, it nonetheless may not be necessary and embodiments lacking the same may be contemplated as within the scope of the invention, that scope being defined only by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A tool for manipulating a fuel injector relative to an internal combustion engine, comprising:

a main body member including a force receiving portion adapted to receive a force and a fuel injector engagement portion adapted to engage the fuel injector, said main body member including, said main body member including a curved base portion adapted to abut a portion of the internal combustion engine;

a pivot member rotatably coupled with said main body member; and a fastener engaging said pivot member and adapted to fixedly couple said pivot member to the internal combustion engine, said main body member is rotatable about said pivot member in response to a force applied to said force receiving portion of the main body member, wherein said curved base portion maintains contact with the portion of the internal combustion engine during rotation of said main body member, and said fuel injector engagement portion is adapted to transmit the force to the fuel injector.

2. The tool of claim 1, wherein said pivot member is located substantially within said main body member.

3. A tool for manipulating a fuel injector relative to an internal combustion engine, comprising:

a main body member including a force receiving portion adapted to receive a force and a fuel injector engagement portion adapted to engage the fuel injector;

a pivot member located substantially within said main body member and rotatably coupled with said main body member, said pivot member has an aperture defined therethrough, and wherein said fastener includes a head portion and a threaded portion, and wherein said head portion abuts a surface of said pivot member and said threaded portion is received within a threaded opening defined in said internal combustion engine; and a fastener engaging said pivot member and adapted to fixedly couple said pivot member to the internal combustion engine, said main body member is rotatable about said pivot member in response to a force applied to said force receiving portion of the main body member, and said fuel injector engagement portion is adapted to transmit the force to the fuel injector.

4. The tool of claim 3, wherein said pivot member is located between said force receiving portion and said fuel injector engagement portion.

5. The tool of claim 3, wherein said fuel injector engagement portion includes a pair of spaced forks adapted to abut and bear on a surface of the fuel injector when said main body member is rotated relative to said pivot member.

6. The tool of claim 3, wherein:

said pivot member is positioned between said force receiving portion and said fuel injector engagement portion and located substantially within said main body member;

said fastener passing through said aperture; and said fuel injector engagement portion includes a pair of spaced members adapted to substantially collar the fuel injector and having a surface adapted to abut and press on a surface of the fuel injector when said main body member is rotated relative to said pivot member.

7. A tool for manipulating a fuel injector relative to an internal combustion engine, comprising:

a main body member including a force receiving portion adapted to receive a force and a fuel injector engagement portion adapted to engage the fuel injector;

a pivot member rotatably coupled with said main body member and having an aperture therethrough, said pivot member is positioned between said force receiving portion and said fuel injector engagement portion and located substantially within said main body member, wherein said fuel injector engagement portion includes a pair of spaced members adapted to substantially collar the fuel injector and having a surface adapted to abut and press on a surface of the fuel injector when said main body member is rotated relative to said pivot member; and a fastener passing through said aperture and engaging said pivot member and adapted to fixedly couple said pivot member to the internal combustion engine, said main body member is rotatable about said pivot member in response to a force applied to said force receiving portion of the main body member, and said fuel injector engagement portion is adapted to transmit the force to the fuel injector, said fastener has a head portion and a threaded shank portion, said head portion abutting an outer surface of said pivot member and said threaded shank portion engaging the internal combustion engine, wherein said pivot member is captured between said head portion and said internal combustion engine.

8. The tool of claim 3, wherein said pivot member and said fastener are oriented substantially perpendicular to one another.

9. The tool of claim 1, wherein said main body member is rotatable about said pivot member in a first direction and moves said force receiving portion in a first direction to push at least a portion of the fuel injector into a bore in the internal combustion engine, and wherein said main body member is rotatable about said pivot member in a second direction and moves said force receiving portion in a second direction to remove at least a portion of the fuel injector from said bore in the internal combustion engine.

10. A tool for manipulating a fuel injector relative to an internal combustion engine, comprising:

a main body member including a force receiving portion adapted to receive a force and a fuel injector engagement portion adapted to engage the fuel injector;

a pivot member rotatably coupled with said main body member;

a fastener engaging said pivot member and adapted to fixedly couple said pivot member to the internal combustion engine, said main body member is rotatable about said pivot member in response to a force applied to said force receiving portion of the main body member, and said fuel injector engagement portion is adapted to transmit the force to the fuel injector; and wherein said main body member has a longitudinal axis, and which further includes an opening formed through said main body member substantially normal to said longitudinal axis, and wherein said pivot member is rotatably mounted within said opening, and further wherein said main body member includes a curved surface adapted to engage a portion of the internal combustion engine.

11. The tool of claim 1, wherein said force receiving portion is configured to receive a wrench.

12. The tool of claim 1, wherein said pivot member is located between said force receiving portion and said fuel injector engagement portion.

13. The tool of claim 1, wherein said fuel injector engagement portion includes a pair of spaced forks adapted to abut and bear on a surface of the fuel injector when said main body member is rotated relative to said pivot member.

14. The tool of claim 1, wherein:

said pivot member is positioned between said force receiving portion and said fuel injector engagement portion and located substantially within said main body member, and wherein said pivot member has an aperture therethrough;

said fastener passing through said aperture; and said fuel injector engagement portion includes a pair of spaced members adapted to substantially collar the fuel injector and having a surface adapted to abut and press on a surface of the fuel injector when said main body member is rotated relative to said pivot member.

15. The tool of claim 10, wherein said pivot member is located between said force receiving portion and said fuel injector engagement portion.

16. The tool of claim 10, wherein said fuel injector engagement portion includes a pair of spaced forks adapted to abut and bear on a surface of the fuel injector when said main body member is rotated relative to said pivot member.

17. The tool of claim 10, wherein:

said pivot member is positioned between said force receiving portion and said fuel injector engagement portion and located substantially within said main body member, and wherein said pivot member has an aperture therethrough;

said fastener passing through said aperture; and said fuel injector engagement portion includes a pair of spaced members adapted to substantially collar the fuel injector and having a surface adapted to abut and press on a surface of the fuel injector when said main body member is rotated relative to said pivot member.

* * * * *